United States Patent
Okada

(10) Patent No.: US 7,158,921 B2
(45) Date of Patent: Jan. 2, 2007

(54) ELECTROMAGNETIC FIELD ANALYZER, ELECTROMAGNETIC FIELD ANALYZING PROGRAM AND STORAGE MEDIUM FOR RECORDING THE PROGRAM

(75) Inventor: Tsutomu Okada, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 18 days.

(21) Appl. No.: 10/527,738

(22) PCT Filed: Nov. 5, 2004

(86) PCT No.: PCT/JP2004/016434

§ 371 (c)(1),
(2), (4) Date: Mar. 14, 2005

(87) PCT Pub. No.: WO2005/057434

PCT Pub. Date: Jun. 23, 2005

(65) Prior Publication Data
US 2006/0009953 A1    Jan. 12, 2006

(30) Foreign Application Priority Data
Dec. 10, 2003    (JP)    ............ 2003-412074

(51) Int. Cl.
  *G06F 15/00* (2006.01)
(52) U.S. Cl. .................................. 702/196
(58) Field of Classification Search ........ 702/196
  See application file for complete search history.

(56) References Cited

U.S. PATENT DOCUMENTS 4,521,909 A * 6/1985 Wang ................ 382/227
6,662,125 B1 * 12/2003 Namiki .............. 702/66
2002/0042698 A1 * 4/2002 Meuris et al. ........ 703/2

OTHER PUBLICATIONS

Official Communication issued on Dec. 7, 2004 in the corresponding PCT Application No. PCT/JP2004/016434 with full English Translation.

Katsumi Tsubota et al., "The speed-up of Finite Element Analysis Using Non-nested Multigrid Method",SA-99-1~12, RM-99-55~66, pp. 19-24, Aug. 1999, (SA-99-4, RM-99-58).

(Continued)

*Primary Examiner*—John Barlow
*Assistant Examiner*—Cindy Khuu
(74) *Attorney, Agent, or Firm*—Keating & Bennett, LLP

(57) ABSTRACT

An electromagnetic field analyzer includes a division-into-element portion that divides form data as an analysis object into coarse elements and fine elements. A prolongation matrix forming portion forms a prolongation matrix defining an electromagnetic field vector of the coarse elements divided by the division-into-element portion related to an electromagnetic field vector of the fine elements. Then, an approximate value calculation portion and an approximate solution correction portion calculate an approximate solution of the electromagnetic field vector of the fine elements by applying an iteration method of simultaneous linear equations while referring to the prolongation matrix. Accordingly, it becomes possible to perform an electromagnetic field analysis at high speed by using a multi-grid method using a non-nested mesh.

6 Claims, 10 Drawing Sheets

OTHER PUBLICATIONS

Herbert De Gersem et al., "Full Multigrid for Magnetostatics Using Unstructured and Non-Nested Meshes"; IEEE Transactions on Magnetics, vol. 37, No. 5, pp. 3460-3464. Sep. 2001.

Akihisa Kameari, "Application of Geometrical Multigrid Method to Electromagnetic Corporation by Finite Element Method", SA-01-1~19, RM-01-69~87, pp. 61-66, Aug. 2001, (SA-01-11, RM-01-79).

R. Hiptmair, "Multigrid Method for Maxwell's Equations", Institut für Mathematick, Universität Augsburg, SIAM Journal of Numerical Analysis, vol. 36, No. 1, , pp. 204-225, 1999.

David Dibben et al., "Non-nested Multigrid and Automatic Mesh Coarsening for High Frequency Electromagnetic Problems", The Japan Research Institute, Ltd., IEEJ Investigating Research Committee Material, SA-02-34, RM-02-70, pp. 71-75, 2002.

* cited by examiner

FIG. 8
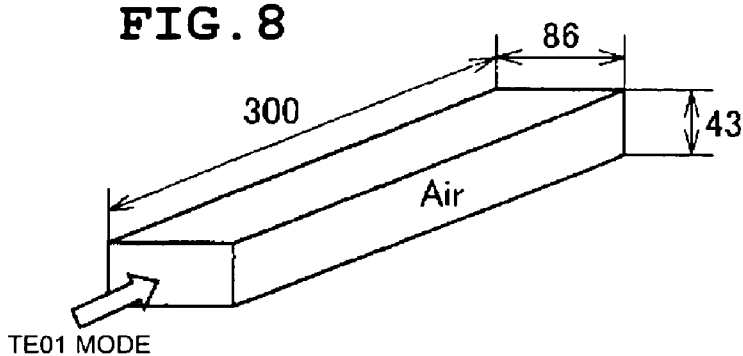
TE01 MODE
FIG. 9
| No | NUMBER OF ELEMENTS | TIME BASED ON DIRECT METHOD | TIME BASED ON PRESENT INVENTION | RATIO |
|---|---|---|---|---|
| 1 | 18,790 | 56 sec | 25 sec | 2.2 |
| 2 | 41,357 | 225 sec | 76 sec | 3.0 |
| 3 | 92,813 | 1,532 sec | 167 sec | 9.2 |
| 4 | 206,266 | 9,356 sec | 562 sec | 16.7 |
FIG. 10
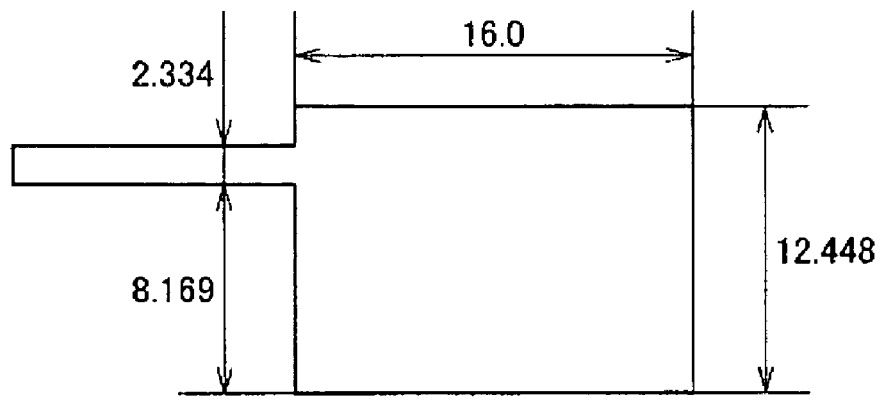
FIG. 11
| No | NUMBER OF ELEMENTS | TIME BASED ON DIRECT METHOD | TIME BASED ON PRESENT INVENTION | RATIO |
|---|---|---|---|---|
| 1 | 19,595 | 641 sec | 170 sec | 3.8 |
| 2 | 41,369 | 2,223 sec | 255 sec | 8.7 |
| 3 | 88,445 | 8,161 sec | 541 sec | 15.0 |

ELECTROMAGNETIC FIELD ANALYZER, ELECTROMAGNETIC FIELD ANALYZING PROGRAM AND STORAGE MEDIUM FOR RECORDING THE PROGRAM

BACKGROUND OF THE INVENTION

1. Field of the Invention

The present invention relates to electromagnetic field simulation technology used in developing and designing high-frequency products such as multilayer products, giga filters, and EMI (Electro-Magnetic Interference) elimination filters, and more particularly, the present invention relates to an electromagnetic field analyzer, an electromagnetic field analyzing program, and a storage medium for recording the program in which the simulation time is reduced.

2. Description of the Related Art

In recent years, the development and design of high-frequency products have been aggressively pursued, and, in order to perform an electromagnetic field analysis of high-frequency products, electromagnetic field simulation software has been commonly used. Generally, there are many instances where a finite element method is used for electromagnetic field analysis. In the electromagnetic field simulation using the finite element method, since it takes a long time to solve simultaneous linear equations, high-speed solving methods are desired. In particular, in the field of electromagnetic field analysis, since only a direct method called a Gauss' elimination method can be used, the problem of long calculation times is more serious.

However, a paper (R. Hiptmair, "Multigrid Method for Maxwell's Equations," SIAM Journal of Numerical Analysis, vol. 36, no. 1, pp. 204–225, 1999), which is referred to herein as Non-patent document 1, and which was made public by Hiptmair in 1999, proved that a solution method called a multi-grid method can be also used in an electromagnetic field analysis and the method greatly reduces the calculation time as compared to a direct method.

In the multi-grid method, an analysis object is divided into two classes of fine elements and coarse elements, and the solution of fine elements is determined using the solution of coarse elements.

When simultaneous linear equations are calculated by the Gauss' elimination method, generally the calculation time is proportional to the third power of the dimensions of a matrix. Since the size of the dimensions corresponds to the number of elements, when the number of elements is doubled, the calculation time is 8 times as large, and, when the number of elements is 10 times as large, the calculation time is 1,000 times as large. When the Gauss' direct method is applied to only coarse elements, an approximate solution to fine elements is obtained by using the solution to coarse elements, and the Gauss' elimination method is not used, the calculation time for fine elements can be reduced to ⅛ and 1/1000, respectively. Since additional calculation time is added, although the practical calculation time is not reduced to such a great extent, the calculation time is always greatly reduced.

The multi-grid method can be broken down into two methods: a method using a nested mesh and a method using a non-nested mesh. However, since a prolongation matrix is incomplete as described later, the method using a nested mesh must be used.

FIGS. 12A and 12B show the division into elements using a nested mesh. FIG. 12A shows the division into elements using a nested mesh in the case of two-dimensional analysis where a coarse triangular element is uniformly divided to form fine triangular elements. Furthermore, FIG. 12B shows the division into elements using a nested mesh in the case of three-dimensional analysis where a coarse tetrahedral element is uniformly divided to form eight fine tetrahedral elements. As understood from FIGS. 12A and 12B, there are geometrical restrictions between coarse elements and fine elements when using a nested mesh.

Another prior art method is described in non-patent document 2: D. Dibben and T. Yamada, "Non-Nested Multigrid and Automatic Mesh Coarsening for High Frequency Electromagnetic Problems" IEEJ Investigating Research Committee Material, SA-02-34, pp. 71–75, 2002.

FIGS. 13A and 13B describe a first problem that occurs when using a nested mesh. FIG. 13A shows how a circle is divided into elements using a nested mesh to form coarse elements. Furthermore, FIG. 13B shows how coarse elements are divided into fine elements using a nested mesh. As understood from FIGS. 13A and 13B, a curved surface cannot be correctly expressed because of the geometrical restrictions of a nested mesh.

Furthermore, FIG. 13C shows how a circle is divided into elements using a non-nested mesh to form fine elements. As understood from FIG. 13C, since there are no geometrical restrictions when using a non-nested mesh, a curved surface can be correctly expressed.

FIGS. 14A to 14C describe a second problem that occurs when using a nested mesh. FIG. 14A shows how a square is divided into elements using a nested mesh to form coarse elements. Furthermore, FIG. 14B shows how coarse elements are divided into fine elements. As understood from FIGS. 14A and 14B, coarse elements cannot be partially divided into fine elements because of the geometrical restrictions of a nested mesh.

Furthermore, FIG. 14C shows how a square is divided into elements using a non-nested mesh to form fine elements. As understood from FIG. 14C, coarse elements can be partially divided into fine elements because there are no geometrical restrictions when using a non-nested mesh.

Most industrial products have curved surfaces, such as a circular cylinder and square surfaces, and they inevitably contain partially fine portions. Accordingly, it is difficult to apply a nested mesh to industrial products. On the other hand, since there are no geometrical restrictions in a non-nested mesh, fine elements can be freely formed. However, since the positional relationship is not systematic, it is difficult to make the electromagnetic field of coarse elements related to the electromagnetic field of fine elements. It is a prolongation matrix to make coarse elements related to fine elements, but no precise prolongation matrix has been found. This means that a multi-grid method cannot be practically used, and accordingly, nothing can be used except for a Gauss' direct method, which requires a lot of time, in the analysis of magnetic field.

SUMMARY OF THE INVENTION

To overcome the problems described above, preferred embodiments of the present invention provide an electromagnetic field analyzer, an electromagnetic field analyzing program, and a recording medium having the program recorded thereon, in which the analysis of an electromagnetic field can be performed via a multi-grid method using a non-nested mesh, and an electromagnetic field analyzer, an electromagnetic field analyzing program, and a recording medium in which the program has been recorded, in which the time required for an electromagnetic field analysis is greatly reduced.

According to a preferred embodiment of the present invention, an electromagnetic field analyzer includes dividing means for dividing form data as an analysis object into coarse elements and fine elements, forming means for forming a matrix defining an electromagnetic field vector of the coarse elements divided by the dividing means related to an electromagnetic field vector of the fine elements, and calculating means for calculating an approximate solution of the electromagnetic field vector of the fine elements by applying an iteration method of simultaneous linear equations while referring to the matrix formed by the forming means.

Preferably, the forming means forms the matrix by expressing the elements of electromagnetic field vectors at the sides at a fine element using an interpolation function in the coarse elements.

More preferably, when the length of a side $l_i$ of the fine element is $|l_i|$, an interpolation function showing the relationship between the electromagnetic field at position x of the side $l_i$ of the fine element and the electromagnetic field at a side j of the coarse element is $N_j^C(x)$, and the tangential vector of the side $l_i$ of the fine element is $t_i$, the forming means forms a matrix $P_{ij}$ preferably by Expression (14) to be described later.

More preferably, in the calculating means, the accuracy of an approximate solution of the electromagnetic field vector of the fine elements is improved such that high-frequency components included in the approximate solution of the electromagnetic field vector of the fine element are removed by applying a stationary iteration method of simultaneous linear equations, such that a residual in the fine elements is mapped to a residual in the coarse elements by using the matrix formed by the forming means, such that a correction vector to the coarse elements is formed by applying a direct method or a non-stationary iteration method of simultaneous linear equations, and such that a correction vector to the fine elements is obtained by using the matrix formed by the forming means.

According to another preferred embodiment of the present invention, in a computer program to control a computer to execute an electromagnetic field analyzing method for analyzing an electromagnetic field as an analysis object, the computer includes a first storage device arranged to store divided elements and a second storage device arranged to store a matrix, and the electromagnetic field analyzing method includes the steps of dividing form data as an analysis object into coarse elements and fine elements and storing the elements in the first storage device, forming a matrix defining an electromagnetic field vector of the coarse elements stored in the first storage device related to an electromagnetic field vector of the fine elements and storing the matrix in the second storage device, and calculating an approximate solution of the electromagnetic field vector of the fine elements by applying an iteration method of simultaneous linear equations while referring to the matrix stored in the second storage device.

According to another preferred embodiment of the present invention, in a computer readable storage medium having stored thereon a program to control a computer to execute an electromagnetic field analyzing method for analyzing an electromagnetic field as an analyzing object, the computer includes a first storage device arranged to store divided elements and a second storage device arranged to store a matrix, and the electromagnetic field analyzing method includes the steps of dividing form data as an analysis object into coarse elements and fine elements and storing the coarse and fine elements in the first storage device, forming a matrix defining an electromagnetic field vector of the coarse elements stored in the first storage device related to an electromagnetic field vector of the fine elements and storing the matrix in the second storage device, and calculating an approximate solution of the electromagnetic field vector of the fine elements by applying an iteration method of simultaneous linear equations while referring to the matrix stored in the second storage device.

Since the forming means forms a matrix defining an electromagnetic field vector of coarse elements divided by the dividing means related to an electromagnetic field vector of fine elements, it is possible to perform an electromagnetic field analysis via a multi-grid method using a non-nested mesh. Furthermore, since the calculating means calculates an approximate solution of the electromagnetic field vector of fine elements while referring to the matrix formed by the forming means, the calculating means is not required to calculate the electromagnetic field of fine elements by using a direct method. Thus, the time required for an electromagnetic field analysis is greatly reduced.

Furthermore, since the forming means forms a matrix such that an electromagnetic field vector element at a side of fine elements is expressed by using an interpolation function in coarse elements, a matrix is easily formed.

Furthermore, in the forming means, since a matrix $P_{ij}$ is formed preferably by Expression (14) to be described later, a matrix is even more easily formed.

Furthermore, in the calculating means, an approximate solution of an electromagnetic field vector of fine elements is corrected by using a matrix formed by the forming means. Thus, the accuracy of the approximate solution of an electromagnetic field vector of fine elements is greatly improved at high speed.

Other features, elements, steps, characteristics and advantages of the present invention will become more apparent from the following detailed description of preferred embodiments thereof with reference to the attached drawings.

BRIEF DESCRIPTION OF THE DRAWINGS

FIG. 8 shows one example of a rectangular waveguide as an analysis object of an electromagnetic field analyzer according to a preferred embodiment of the present invention.

FIG. 9 shows the calculation time to the number of elements when the rectangular waveguide shown in FIG. 8 is driven in TE10 mode of 2.45 GHz, which is compared between the case where a related direct method is used and the case where a method of a preferred embodiment of the present invention is used.

FIG. 10 shows one example of a patch antenna as an analysis object of the electromagnetic field analyzer according to a preferred embodiment of the present invention.

FIG. 11 shows the calculation time to the number of elements when the patch antenna shown in FIG. 10 is driven at 7.0 GHz, which is compared between the case where a related direct method is used and the case where a method of the present invention is used.

DETAILED DESCRIPTION OF PREFERRED EMBODIMENTS

Figure 1:
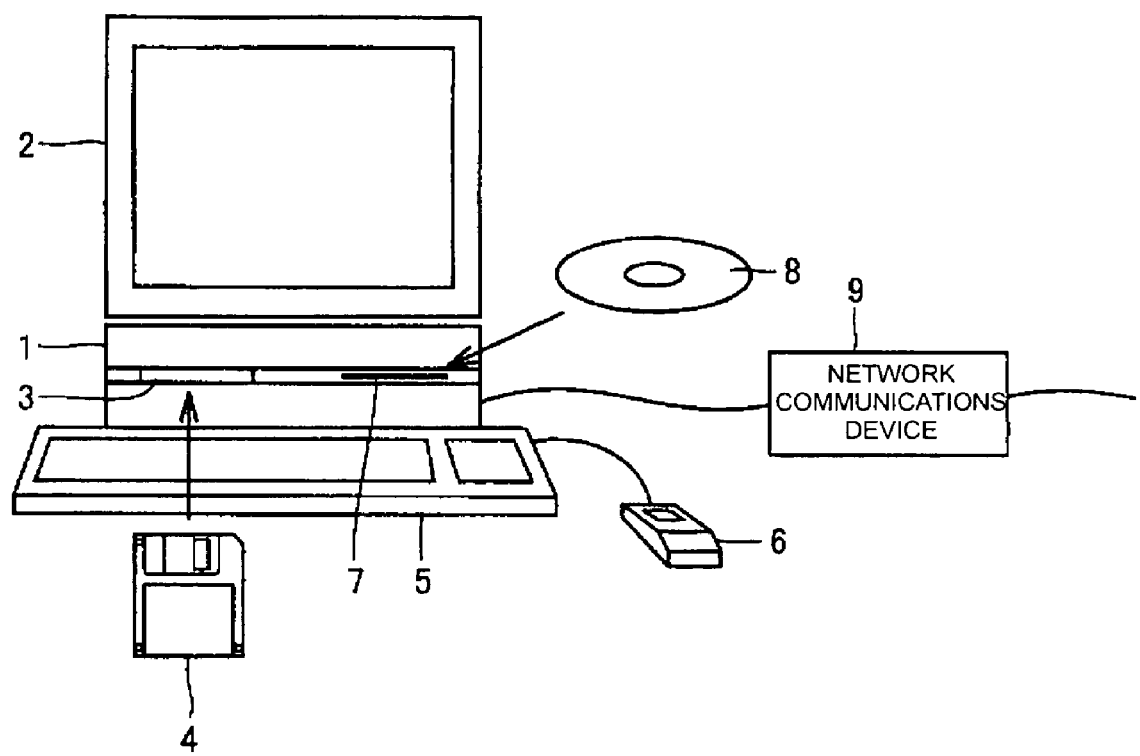
FIG. 1 shows an electromagnetic field analyzer according to a preferred embodiment of the present invention.

FIG. 1 shows an electromagnetic field analyzer according to a preferred embodiment of the present invention. The electromagnetic field analyzer preferably includes a computer main body 1, a display device 2, an FD (Flexible Disk) drive 3 to which an FD 4 is attached, a keyboard 5, a mouse 6, a CD-ROM (Compact Disk-Read Only Memory) drive 7 to which a CD-ROM 8 is attached, and a network communications device 9. An electromagnetic field analyzing program is supplied through a recording medium such as an FD 4, or a CD-ROM 8, or other suitable media. An electromagnetic field analysis is performed such that the electromagnetic field analyzing program is executed by the computer main body 1. Furthermore, the electromagnetic field analyzing program may be supplied to the computer main body 1 by another computer through the network communications device 9.

Figure 2:
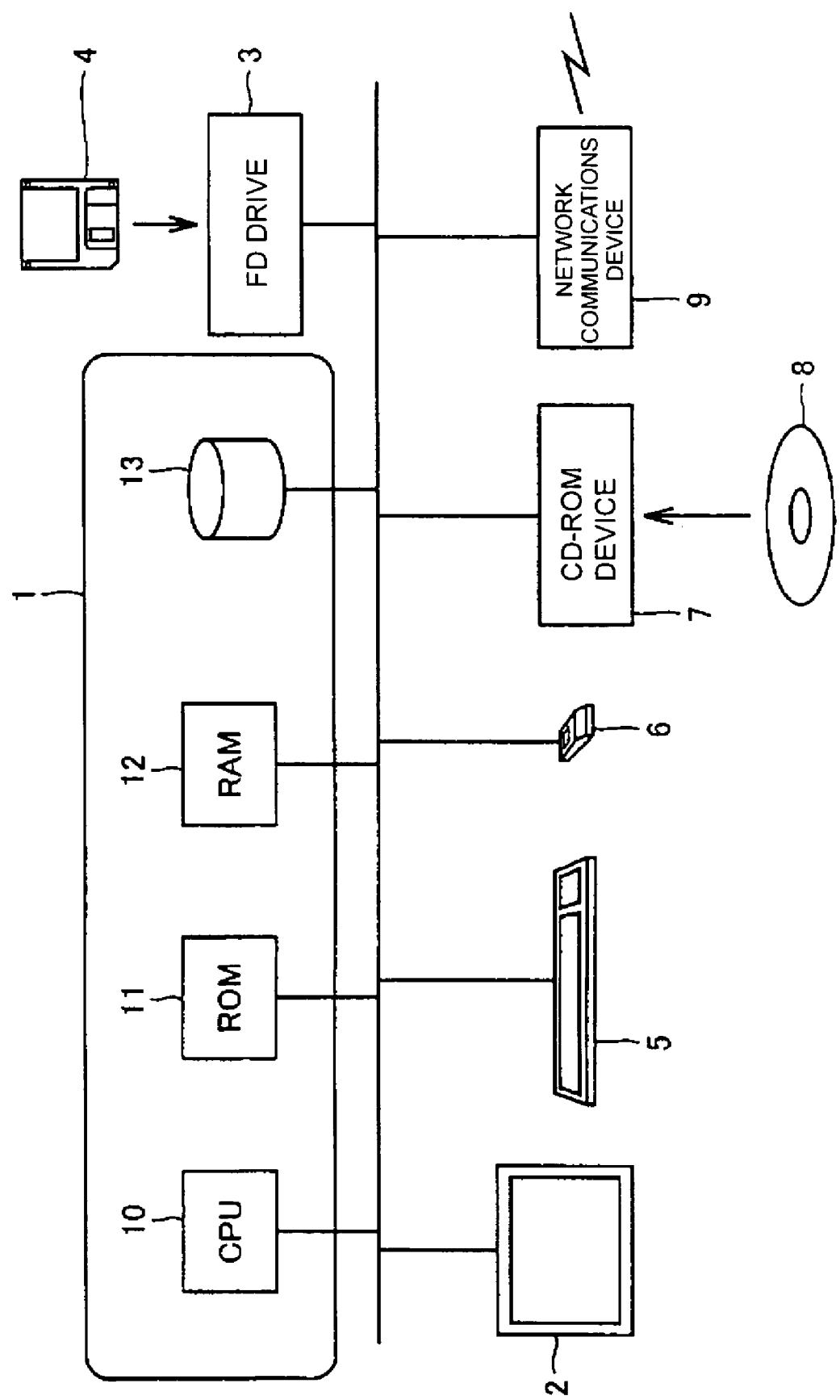
FIG. 2 is a block diagram showing the construction of the electromagnetic field analyzer according to a preferred embodiment of the present invention.

FIG. 2 is a bock diagram showing the construction of the electromagnetic field analyzer according to a preferred embodiment of the present invention. The computer main body 1 shown in FIG. 1 includes a CPU (Central Processing Unit) 10, a ROM (Read Only Memory) 11, a RAM (Random Access Memory) 12, and a hard disk 13. The CPU 10 performs processing while the CPU 10 inputs and outputs data to the display device 2, the FD drive 3, the keyboard 5, the mouse 6, the CD-ROM device 7, the network communications device 9, the ROM 11, the RAM 12, or the hard disk 13. The electromagnetic field analyzing program in the FD 4 or the CD-ROM 8 is preferably stored on the hard disk 13 through the FD drive 3 or the CD-ROM drive 7. The electromagnetic field analysis is performed such that the CPU 10 properly loads the electromagnetic field analyzing program from the hard disk 13 in the RAM 12 and executes the program.

Figure 3:
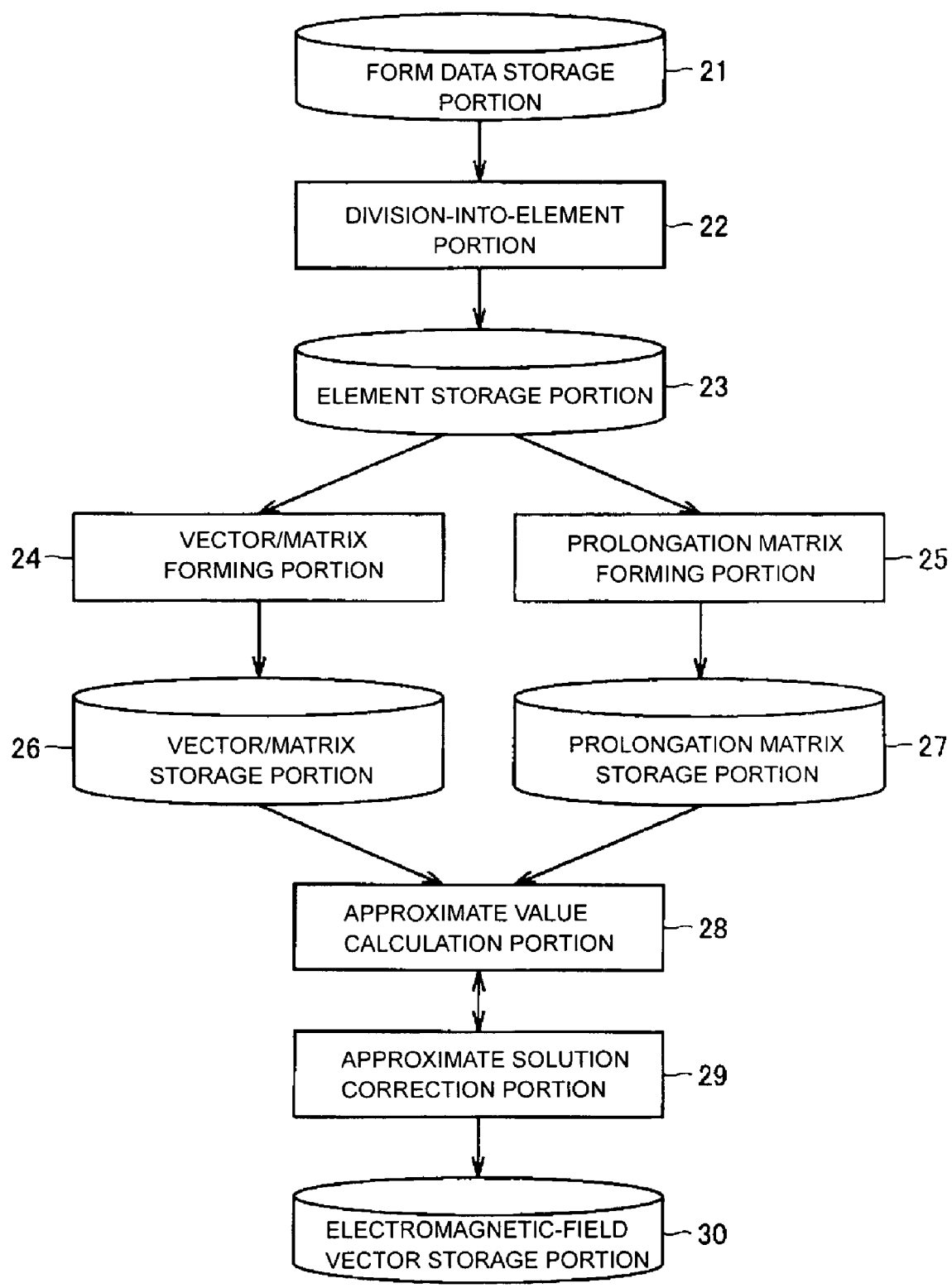
FIG. 3 is a block diagram showing the functional structure of the electromagnetic field analyzer.

FIG. 3 is a block diagram showing the functional structure of the electromagnetic field analyzer according to a preferred embodiment of the present invention. The electromagnetic field analyzer includes a form data storage portion 21 for storing form data as an analysis object, a division-into-element portion 22 for dividing the form data, such that the size of elements is changed, an element storage portion 23 for storing the elements divided by the division-into-element portion 22, a vector/matrix forming portion 24 for forming a vector and matrix in simultaneous linear equations, a prolongation matrix forming portion 25 for forming a prolongation matrix, a vector/matrix storage portion 26 for storing the vector and matrix formed by the vector/matrix forming portion 24, a prolongation matrix storage portion 27 for storing the prolongation matrix formed by the prolongation matrix forming portion 25, an approximate value calculation portion 28 for calculating an approximate value of an electromagnetic field vector, an approximate solution correction portion 29 for correcting the approximate solution calculated by the approximate value calculation portion 28, and an electromagnetic-field vector storage portion 30 for storing, as an electromagnetic field vector, the approximate solution after having been corrected by the approximate solution correction portion 29.

Moreover, the form data storage portion 21, the element storage portion 23, the vector/matrix storage portion 26, the prolongation matrix storage portion 27, and the electromagnetic field vector storage portion 30 are provided in a fixed area in the RAM 12 or on the hard disk 13 shown in FIG. 2. Furthermore, the functions of the division-into-element portion 22, the vector/matrix forming portion 24, the prolongation matrix forming portion 25, the approximate value calculation portion 28, and the approximate solution correction portion 29 are arranged such that the CPU 10 shown in FIG. 2 executes the electromagnetic field analyzing program loaded into the RAM 12.

Figure 4:
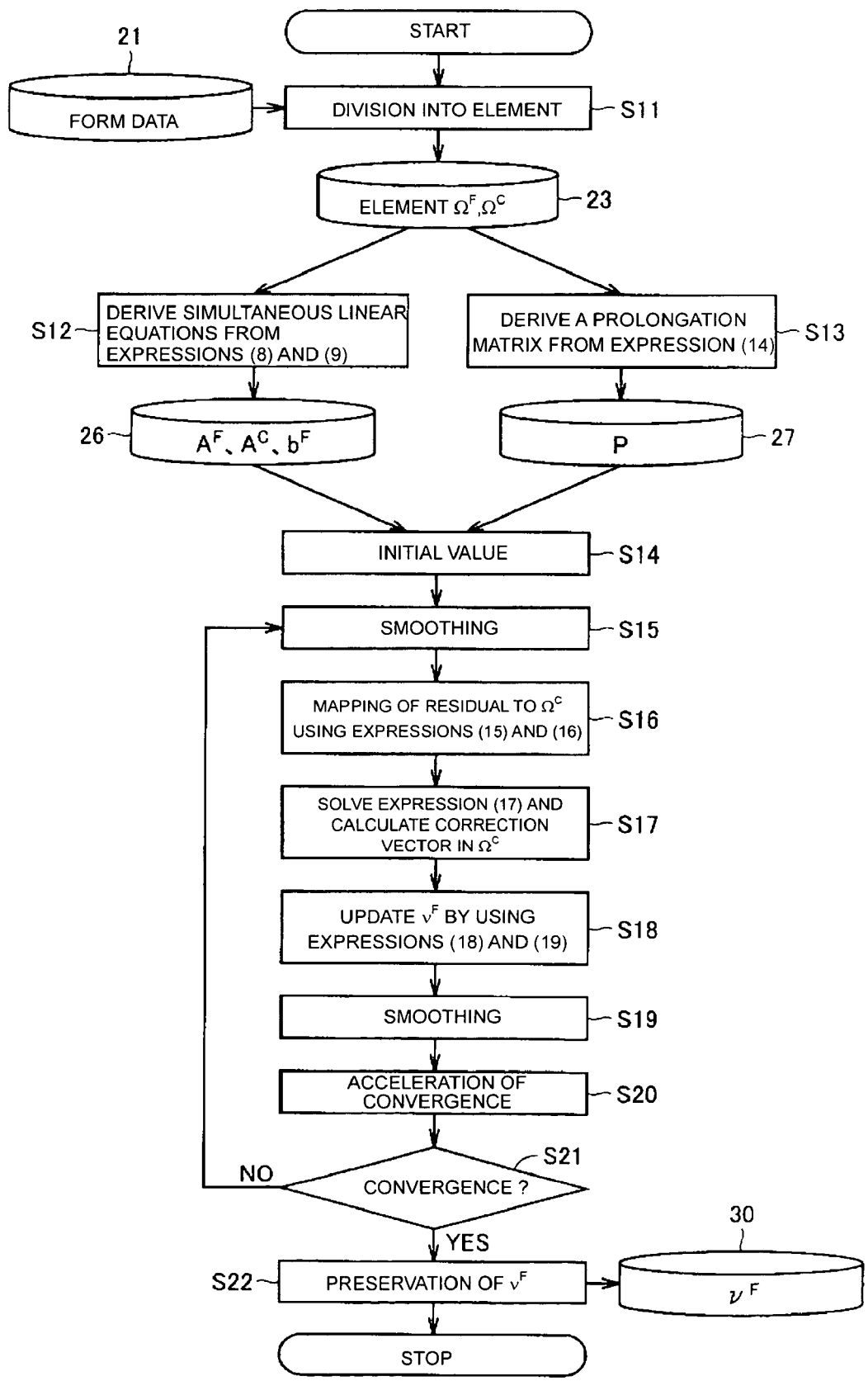
FIG. 4 is a flow chart for describing the procedure of the electromagnetic field analyzer.

FIG. 4 is a flow chart for describing the procedure of the electromagnetic field analyzer according to a preferred embodiment of the present invention. First, the division-into-element portion 22 reads form data as an analysis object stored in the form data storage portion 21, divides the form data into elements, and stores the divided elements in the element storage portion 23 (S11). The division-into-element portion 22 divides the form data into triangular or quadrangular elements in the case of two-dimensional analysis, and divides the form data into tetrahedral, triangle-pole-shaped, or square-pole-shaped elements in the case of three-dimensional analysis.

The division-into-element portion 22 divides the form data while changing the size of the elements. In order to make the description simple, elements of two different sizes are formed and it is assumed that a set of larger (coarse) elements is made $\Omega^c$ and a set of smaller (fine) elements is made $\Omega^F$. Moreover, a superscript of c represents coarse, and a superscription of F represents fine.

The sets of $\Omega^c$ and $\Omega^F$ may be independently formed, however, when the set of $\Omega^c$ is first formed and then the set of $\Omega^F$ is formed by subdividing the elements, the processing time is reduced. Regarding the method of subdivision, there is a method for subdividing elements which are larger in volume and a method for analyzing elements by using $\Omega^c$ and subdividing elements having a large error. Either of them may be used, however, the method in which error is evaluated has better calculation accuracy. Moreover, regarding the method for evaluating error, Reference Document No. 1 (Norio Kamiya et al., "Computer and Application's Monk, Special Edition/Error Estimation in Software and Adaptive Element," No. 42, CORONA PUBLISHING CO., 1993) may be referred to.

Figure 5A:
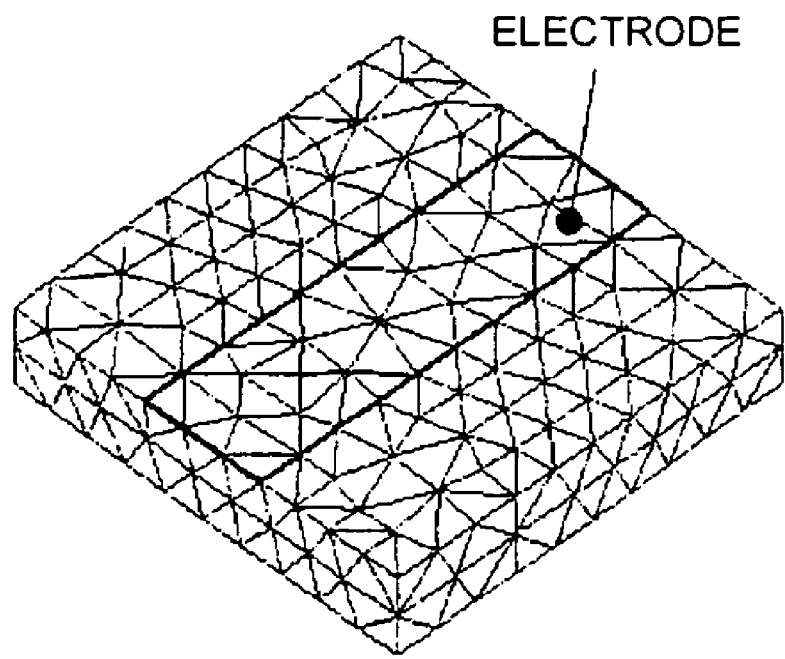
FIG. 5A shows a microstrip line divided into large elements.
Figure 5B:
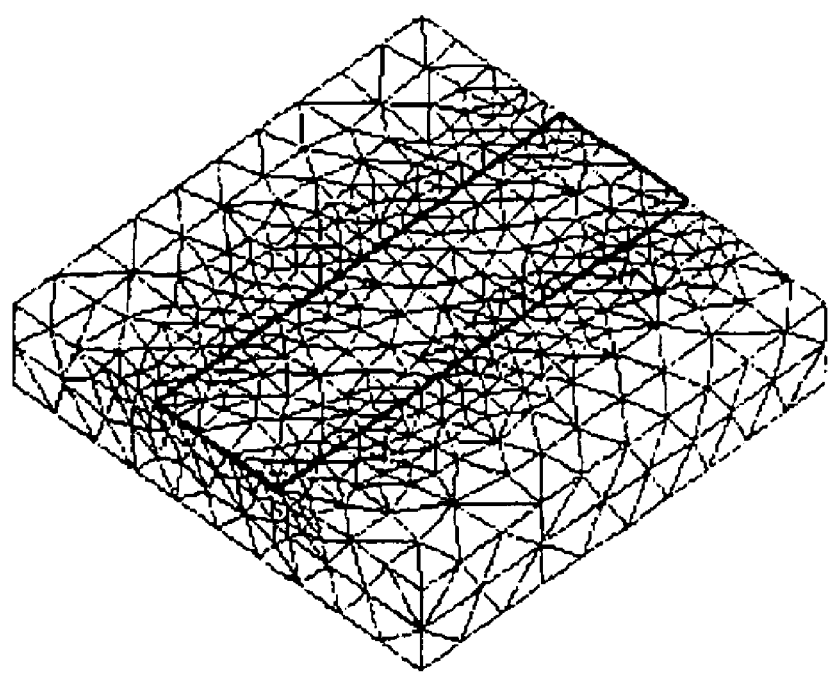
FIG. 5B shows a microstrip line which is analyzed using the large elements shown in FIG. 5A, and in which the elements are subdivided based on their error estimation.

FIGS. 5A and 5B show examples of division into elements in a microstrip line. In FIG. 5A, the microstrip line is divided into larger elements. Furthermore, in FIG. 5B, an analysis is performed by using the larger elements in FIG. 5A and the elements are subdivided based on their error estimation. Since the electromagnetic field is concentrated at the edge of an electrode, the portion is subdivided into smaller elements.

Next, the vector/matrix forming portion 24 reads the sets $\Omega^C$ and $\Omega^F$ stored in the element storage portion 23, discretization of the sets takes place using their elements such that a finite element method is applied to a Maxwell equation, and a matrix and column vector in simultaneous linear equations are formed (S12). Here, the Maxwell equation as an object is represented by the following expressions:

Expressions 1 and 2

$$\nabla \times H = (\hat{\sigma} + j\omega\hat{\epsilon})E \tag{1}$$

$$\nabla \times E = -j\omega\hat{\mu}H \tag{2}$$

Where E: electric field, H: magnetic field, $\epsilon$: dielectric constant, $\mu$: permeability, $\sigma$: conductivity, $\omega$: angular frequency, $\nabla$: differential operator ($\partial/\partial x$, $\partial/\partial y$, $\partial/\partial z$), X: outer product, j: imaginary number From these expressions, the following differential equation is obtained:

Expression 3

$$\nabla \times \hat{p} \nabla \times u - \omega^2 \hat{q} u = 0 \tag{3}$$

u represents an electric field, magnetic field, etc., and $\hat{p}$ and $\hat{q}$ represent characteristic values of dielectric constant and permeability. For example, when Expression (3) is obtained by substituting Expression (2) into Expression (1) and eliminating H, u represents an electric field, $\hat{p}$ represent the reciprocal of a permeability, and $\hat{q}$ represents a dielectric constant.

When a finite element method is applied to an element $V_k$ formed in the former process described above, the following expression is obtained:

Expression 4

$$\int_{V_k}(\nabla \times N_{ki})\hat{p}(\nabla \times u)dV - \omega^2\int_{V_k}N_{ki}\hat{q}udV = \int_{\partial V_k}(N_{ki}\times \hat{p}\nabla \times u)\cdot n dS \tag{4}$$

Here, $\partial V_k$ represents the surface of $V_k$ and n represents an outward normal unit vector. $N_{ki}$ represents an interpolation function (also called a shape function, insertion function, or basis function). When tetrahedral elements and linear equations are used, the interpolation function is given by the following expression:

Expression 5

$$N_{k1}=|l_1|(L_2\nabla L_3-L_3\nabla L_2)$$

$$N_{k2}=|l_2|(L_3\nabla L_1-L_1\nabla L_3)$$

$$N_{k3}=|l_3|(L_1\nabla L_2-L_2\nabla L_1)$$

$$N_{k4}=|l_4|(L_1\nabla L_4-L_4\nabla L_1)$$

$$N_{k5}=|l_5|(L_2\nabla L_4-L_4\nabla L_2)$$

$$N_{k6}=|l_6|(L_3\nabla L_4-L_4\nabla L_3) \tag{5}$$

Here, $L_{1\ to\ L4}$ represent a volume coordinate system and $|l_1|$ to $|l_6|$ represent the length of a side $l_i$. Moreover, regarding the detail of the volume coordinate system, Reference Document 2 (T. Itoh, G. Pelosi and P. P. Silvester, "Finite Element Software for Microwave Engineering," John Wiley & Sons, pp. 101–125, 1996) may be referred to.

Figure 6:
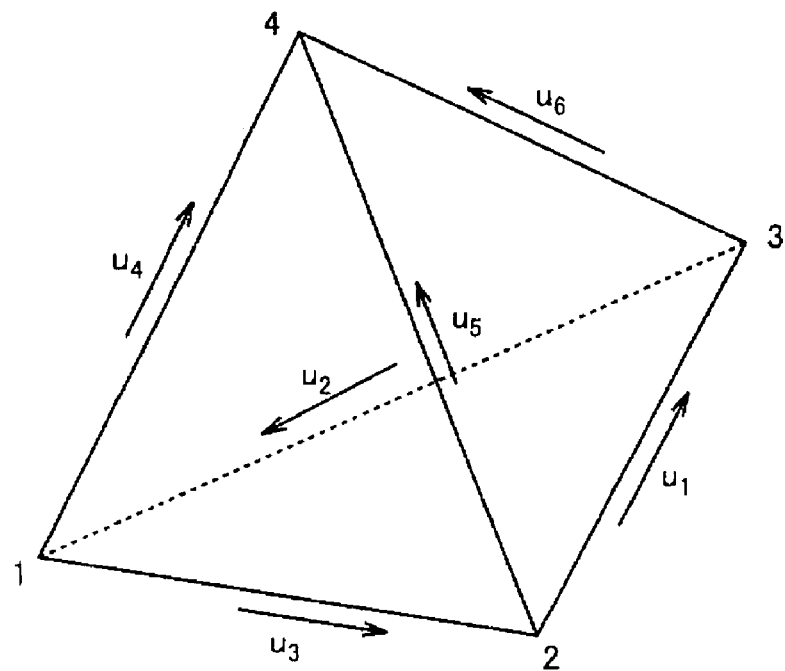
FIG. 6 shows components of an electromagnetic field that are in contact with the sides of a tetrahedron.

FIG. 6 shows components of an electromagnetic field u that are in contact with the sides of a tetrahedron. The components of the electromagnetic field u are arranged so as to be disposed along the six sides, and are represented by $u_1$ to $u_6$. The electromagnetic field at point x inside the element $V_k$ is represented by the following expression using Expression (6) and the six components of an electromagnetic field:

Expression 6

$$u(x) = \sum_{i=1}^{6} N_{ki}(x)u_{ki} \tag{6}$$

When Expression (6) is substituted into Expression (4) and applied to all of the elements of $\Omega^F$, the following simultaneous linear equations are obtained:

Expression 7

$$A^F u^F = b^F \tag{7}$$

Here, $u^F$ represents vectors which are electromagnetic fields disposed at the sides, and the dimensions are equal to the number of the sides as a general rule. The components of a matrix $A^F$ are formed by the following expression:

Expression 8

$$\sum_{k=1}^{N^F}\sum_{i=1}^{6}\sum_{j=1}^{6}\left[\int_{V_k}(\nabla \times N_{ki})\hat{p}(\nabla \times N_{kj})dV - \omega^2\int_{V_k}N_{ki}\hat{q}N_{kj}dV\right] \tag{8}$$

Furthermore, a vector $b^F$ is formed by the following expression.

Expression 9

$$\sum_{k=1}^{N^F}\sum_{i=1}^{6}\sum_{j=1}^{6}\int_{\partial V_k}(N_{ki}\times \hat{p}\nabla \times N_{kj})\cdot n dS \tag{9}$$

Here, $N^F$ is the number of elements in $\Omega^F$.

The vector/matrix forming portion 24 also forms a matrix $A^C$ corresponding to $\Omega^C$ via the same procedure and preserves $A^F$ $b^F$, and $A^C$ in the vector/matrix storage portion 26. When $u^F$ is determined by calculating simultaneous linear equations in Expression (7), the electromagnetic field distribution can be calculated using Expression (6) to produce the solutions of Maxwell equations in Expressions (1) and (2).

Next, the prolongation matrix forming portion 25 reads elements $\Omega^F$ and $\Omega^C$ formed in the former process from the element storage portion 23 and, based on the geometric information, the prolongation matrix forming portion 25 forms a prolongation matrix P which relates the electromagnetic field vector $u^F$ in $\Omega^F$ to the electromagnetic field vector $u^C$ in $\Omega^C$ (S13). When the prolongation matrix is used, as shown in the following expressions, one vector can be used to determine the other vector:

Expressions 10 and 11

$$u^F = Pu^C \tag{10}$$

$$u^C = P^t u^F \tag{11}$$

Here, t means a transposed matrix.

Figure 7:
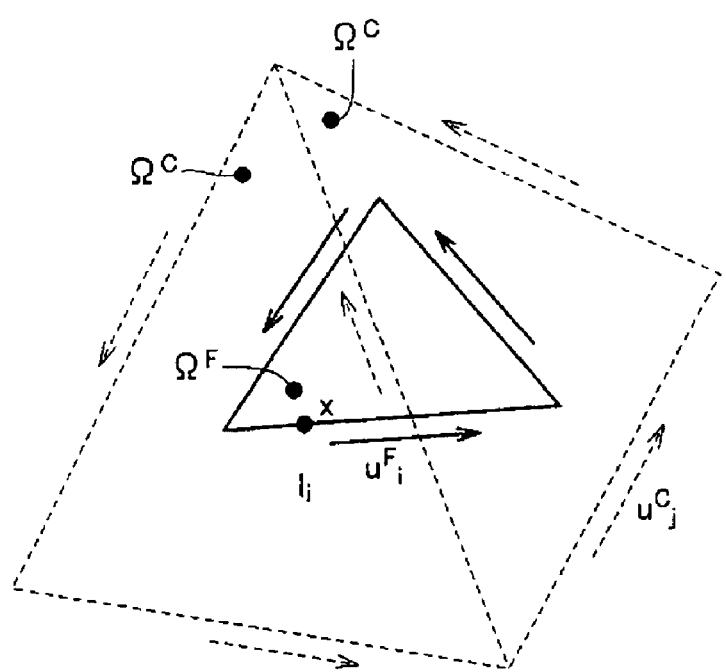
FIG. 7 shows the relationship between an electromagnetic field vector $u^F$ in $\Omega^F$ and an electromagnetic field vector $u^C$ in $\Omega^C$.
Figure 12A:
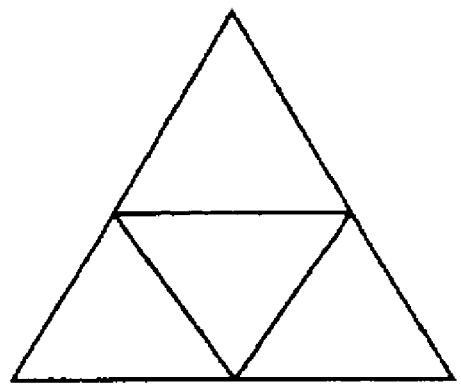
FIG. 12A shows elements divided by using a nested mesh in the case of two-dimensional analysis.
Figure 12B:
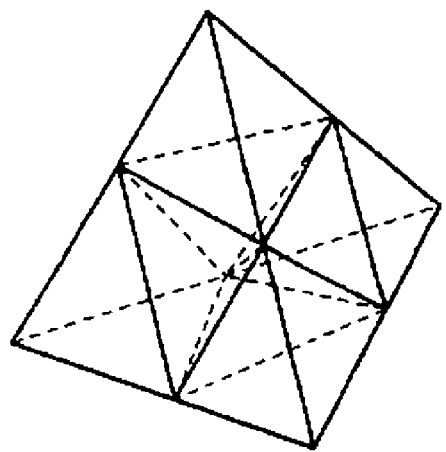
FIG. 12B shows elements divided by using a nested mesh in the case of three-dimensional analysis.
Figure 13A:
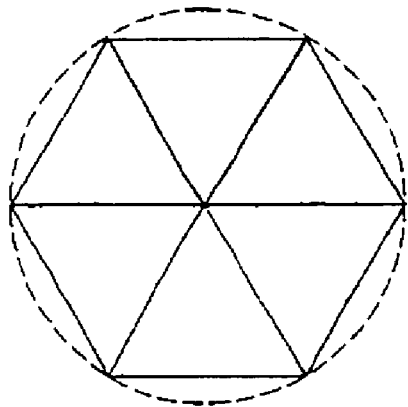
FIG. 13A shows coarse elements formed such that a circle is divided into elements by using a nested mesh.
Figure 13B:
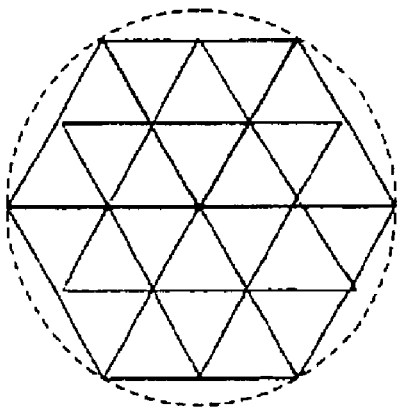
FIG. 13B shows fine elements into which coarse elements are divided by using a nested mesh.
Figure 13C:
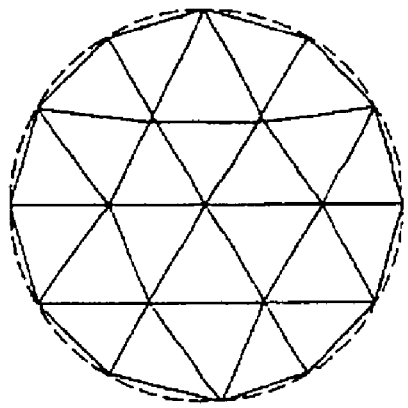
FIG. 13C shows fine elements formed such that a circle is divided into elements by using a non-nested mesh.
Figure 14A:
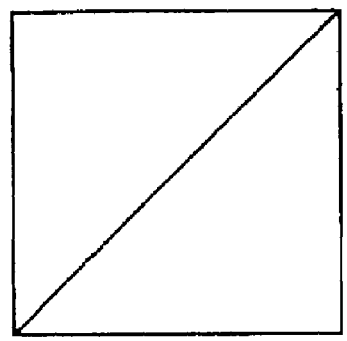
FIG. 14A shows coarse elements formed such that a square is divided into elements using a nested mesh.
Figure 14B:
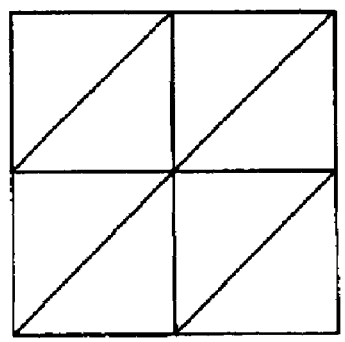
FIG. 14B shows fine elements into which coarse elements are divided by using a nested mesh.
Figure 14C:
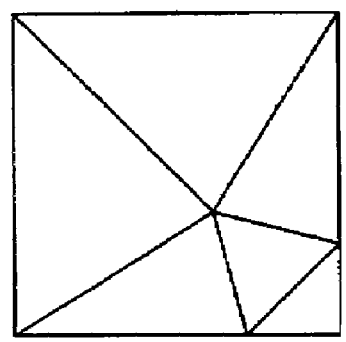
FIG. 14C shows fine elements formed such that a square is divided into elements by using a non-nested mesh.

FIG. 7 shows the relationship between an electromagnetic field vector $u^F$ in $\Omega^F$ and an electromagnetic field vector $u^C$ in $\Omega^C$. The j component $u_j^C$ of the column vector $u^C$ is disposed at the side of an element of $\Omega^C$ and the electromagnetic field $u(x)$ at the position x in $\Omega^F$ can be represented using an interpolation function $N^C$ in $\Omega^C$:

Expression 12

$$u(x) = \sum_j N_j^C(x) u_j^C \qquad (12)$$

The i component $u_i^F$ of $u^F$ is an average value of an electromagnetic field at the side $l_i$ where the i component $i_i^F$ is disposed. That is, the i component $u_i^F$ of $u^F$ is represented by the following expression:

Expression 13

$$u_i^F = \frac{1}{|l_i|} \int_{l_i} u(x) \cdot t_i \, dl \qquad (13)$$

Here, $t_i$ represents a tangential unit vector of the side $l_i$. When Expression (12) is substituted for Expression (13) and compared with Expression (10), the ij component $P_{ij}$ of a prolongation matrix P is given by the following expression.

Expression 14

$$P_{ij} = \frac{1}{|l_i|} \int_{l_i} N_j^C(x) \cdot t_i \, dl \qquad (14)$$

The prolongation matrix forming portion 25 forms a prolongation matrix using Expression (14) and preserves the prolongation matrix in the prolongation matrix storage portion 27.

Next, the approximate value calculation portion 28 sets an approximate initial value $v^F$ to $u^F$ in order to calculate the electromagnetic field vector $v^F$ using simultaneous linear equations according to a multi-grid method (S14). The initial value $v^F$ may be zero. Moreover, the details of the calculation of the simultaneous linear equations according to the multi-grid method may be referred to in Reference Document 3 (W. Briggs, V. Henson and S. McCormick, "A Multigrid Tutorial," SIAM).

Next, the approximate value calculation portion 28 removes high-frequency components of error contained in $v^F$ by applying a stationary iteration method of simultaneous linear equations, such as the Jacob method, the Gauss-Seidel method or the SOR method, to Expression (7) (S15). Moreover, the details of the iteration method can be referred to in Reference Document 4 (Satomi Hasegawa, Hidehiko Hasegawa, Kiyoji Fujino, "Iteration Method Templates", Asakura Shoten, 1996).

Next, the approximate value calculation portion 28 maps a residual $r^F$ in $\Omega^F$ to a residual $r^C$ in $\Omega^C$ by using the following expressions in order to remove low-frequency components (S16).

Expressions 15 and 16

$$r^F = b^F - A^F v^F \qquad (15)$$

$$r^C = P^t r^F \qquad (16)$$

Next, the approximate value calculation portion 28 determines solutions of simultaneous linear equations in the following expression (17) and calculates a correction vector $e^c$ (S17):

Expression 17

$$A^C e^C = r^C \qquad (17)$$

In Expression (17), although a non-stationary iteration method, such as a direct method according to the Gauss elimination method, a CG method or a GMRES method is preferably used, since Expression (17) is a small matrix as compared to Expression (7), the calculation can be performed in a short time. Moreover, the details of the iteration method can be referred to in the above-mentioned document 4.

Next, the approximate solution correction portion 29 improves the accuracy of the approximate solution by returning the correction vector of $\Omega^C$ to the correction vector of QF by using the following Expressions (18) and (19) at (S18):

Expression 18 and 19

$$e^F = Pe^C \qquad (18)$$

$$v^F = v^F + e^F \qquad (19)$$

The approximate solution correction portion 29 makes high-frequency components attenuated by applying smoothing shown in step 15 a couple of times to the approximate solution (S19).

Although the above processing in step S15 to S19 is the basic algorithm of a multi-grid method, since there are cases where the convergence is relatively slow, the convergence is accelerated by using another iteration method for simultaneous linear equations together as required (S20). Specifically, the above-described processing is used as a pretreatment for a non-stationary iteration method, such as a CG method, a GMRES method or a GCR method, or the processing is accelerated by a residual cutting method, etc. Moreover, the details of the residual cutting method can be referred to in Reference Document 5 (Kikuchi et al., JSME International Journal, 62–604, Series B p. 4076, December 1996).

Next, the approximate solution correction portion 29 evaluates the residual of Expression (15) in step (S21). When the residual is large (S21 is no), since the electromagnetic field vector does not converge, the process returns to step S15 and the following processing is repeated. Furthermore, when the residual has a sufficiently small value (S21 is yes), it is determined that the electromagnetic field vector converges, and the approximate solution $v^F$ is stored in the electromagnetic field vector storage portion 30 (S22) and the processing is finished.

FIG. 8 shows one example of a rectangular waveguide as an analysis object of an electromagnetic field analyzer according to a preferred embodiment of the present invention. The dimensions of this rectangular waveguide are as shown in FIG. 8 and the inside is filled with air. The electromagnetic field analysis is performed using tetrahedral primary elements.

In FIG. 9, the calculation time to the number of elements when the rectangular waveguide shown in FIG. 8 is driven in TE10 mode of 2.45 GHz is compared between the case where a related direct method is used and the case where a method according to the present invention is used. As understood from FIG. 9, when the number of elements increases, the effect of the case where an electromagnetic field analyzer according to the present preferred embodiment is used is more pronounced and, when the number of elements is 206,266, the speed of the processing is about 17 times greater than that of the related direct method.

FIG. 10 shows one example of a patch antenna as an analysis object of the electromagnetic field analyzer according to a preferred embodiment of the present invention. The dimensions of the patch antenna are shown in FIG. 10, and the patch antenna is disposed on a dielectric substrate having a thickness of about 0.794 mm and a dielectric constant of about 2.2. The electromagnetic field analysis is performed by using primary tetrahedral elements.

In FIG. 11, the calculation time to the number of elements when the patch antenna shown in FIG. 10 is driven at 7.0 GHz is compared between the case where a related direct method is used and the case where a method according to a preferred embodiment of the present invention is used. As is understood from FIG. 11, when the number of elements increases, the effect of the case where an electromagnetic field analyzer of the present preferred embodiment is used is pronounced and, when the number of elements is 88,445, the speed of the processing is about 15 times than that of the related direct method.

As described above, according to the electromagnetic field analyzer of the present preferred embodiment, since a prolongation matrix P defining the electromagnetic field vector $u^F$ in $\Omega^F$ related to the electromagnetic field vector $u^C$ in $\Omega^C$ is formed and an electromagnetic field vector is calculated by using this prolongation matrix, it is possible to perform an electromagnetic field analysis by using a multi-grid method using a non-nested mesh.

Furthermore, since it is possible to perform an electromagnetic field analysis by using a multi-grid method using a non-nested mesh, the time required for analysis is greatly reduced as compared to an electromagnetic field analysis using a direct method.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

The invention claimed is:

1. An electromagnetic field analyzer comprising:
dividing means for dividing form data as an analysis object into coarse elements and fine elements;
forming means for forming a matrix defining an electromagnetic field vector of the coarse elements divided by the dividing means related to an electromagnetic field vector of the fine elements; and
calculating means for calculating an approximate solution of the electromagnetic field vector of the fine elements by applying an iteration method of simultaneous linear equations while referring to the matrix formed by the forming means; wherein
the forming means forms the matrix by expressing the elements of electromagnetic field vectors at the sides at a fine element using an interpolation function in the coarse elements; and
when the length of a side $l_i$ of the fine element is $|l_i|$, an interpolation function showing a relationship between the electromagnetic field at position x of the side $l_i$ of the fine element and the electromagnetic field at a side j of the coarse element is $N_j^C(x)$, and the tangential vector of the side $l_i$ of the fine element is $t_i$, the forming means forms a matrix $P_{ij}$ by using the following expression:

$$P_{ij} = \frac{1}{|l_i|}\int_{l_i} N_j^C(x)\cdot t_i\, dl. \tag{14}$$

2. An electromagnetic field analyzer according to claim 1, wherein, in the calculating means, the accuracy of an approximate solution of the electromagnetic field vector of the fine elements is improved such that high-frequency components included in the approximate solution of the electromagnetic field vector of the fine element are removed by applying a stationary iteration method of simultaneous linear equations, such that a residual in the fine elements is mapped to a residual in the coarse elements by using the matrix formed by the forming means, such that a correction vector to the coarse elements is formed by applying a direct method or a non-stationary iteration method of simultaneous linear equations, and such that a correction vector to the fine elements is obtained by using the matrix formed by the forming means.

3. A computerized method of controlling a computer to analyze an electromagnetic field as an analysis object, wherein the computer includes a first storage device arranged to store divided elements and a second storage device arranged to store a matrix and a display arranged to display a solution, the computerized method comprising the steps of:
dividing form data as an analysis object into coarse elements and fine elements and storing the elements in the first storage device;
forming a matrix defining an electromagnetic field vector of the coarse elements stored in the first storage device related to an electromagnetic field vector of the fine elements and storing the matrix in the second storage device;
calculating an approximate solution of the electromagnetic field vector of the fine elements by applying an iteration method of simultaneous linear equations while referring to the matrix stored in the second storage device; and
displaying the approximate solution obtained in the calculating step; wherein
the step of forming forms the matrix by expressing the elements of electromagnetic field vectors at the sides at a fine element using an interpolation function in the coarse elements; and
when the length of a side $l_i$ of the fine element is $|l_i|$, an interpolation function showing a relationship between the electromagnetic field at position x of the side $l_i$ of the fine element and the electromagnetic field at a side j of the coarse element is $N_j^C(x)$, and the tangential vector of the side $l_i$ of the fine element is $t_i$, the forming means forms a matrix $P_{ij}$ by using the following expression:

$$P_{ij} = \frac{1}{|l_i|}\int_{l_i} N_j^C(x)\cdot t_i\, dl. \tag{14}$$

4. A computerized method according to claim 3, wherein, in the step of calculating, the accuracy of an approximate solution of the electromagnetic field vector of the fine elements is improved such that high-frequency components included in the approximate solution of the electromagnetic field vector of the fine element are removed by applying a stationary iteration method of simultaneous linear equations, such that a residual in the fine elements is mapped to a residual in the coarse elements by using the matrix formed by the step of forming, such that a correction vector to the coarse elements is formed by applying a direct method or a non-stationary iteration method of simultaneous linear equations, and such that a correction vector to the fine elements is obtained by using the matrix formed by the step of forming.

5. A computer-readable storage medium having stored thereon a program to control a computer to execute an electromagnetic field analyzing method for analyzing an electromagnetic field as an analyzing object, wherein the computer includes a first storage device arranged to store divided elements and a second storage device arranged to store a matrix, the electromagnetic field analyzing method comprising the steps of:

dividing form data as an analysis object into coarse elements and fine elements and storing the elements in the first storage device;

forming a matrix defining an electromagnetic field vector of the coarse elements stored in the first storage device related to an electromagnetic field vector of the fine elements and storing the matrix in the second storage device; and calculating an approximate solution of the electromagnetic field vector of the fine elements by applying an iteration method of simultaneous linear equations while referring to the matrix stored in the second storage device; wherein the step of forming forms the matrix by expressing the elements of electromagnetic field vectors at the sides at a fine element using an interpolation function in the coarse elements; and when the length of a side $l_i$ of the fine element is $|l_i|$, an interpolation function showing a relationship between the electromagnetic field at position x of the side $l_i$ of the fine element and the electromagnetic field at a side j of the coarse element is $N_j^C(x)$, and the tangential vector of the side $l_i$ of the fine element is $t_i$, the forming means forms a matrix $P_{ij}$ by using the following expression:

$$P_{ij} = \frac{1}{|l_i|} \int_{l_i} N_j^C(x) \cdot t_i \, dl. \tag{14}$$

6. A computer-readable storage medium according to claim 5, wherein, in the step of calculating, the accuracy of an approximate solution of the electromagnetic field vector of the fine elements is improved such that high-frequency components included in the approximate solution of the electromagnetic field vector of the fine element are removed by applying a stationary iteration method of simultaneous linear equations, such that a residual in the fine elements is mapped to a residual in the coarse elements by using the matrix formed by the step of forming, such that a correction vector to the coarse elements is formed by applying a direct method or a non-stationary iteration method of simultaneous linear equations, and such that a correction vector to the fine elements is obtained by using the matrix formed by the step of forming.

* * * * *